(12) United States Patent
Shin et al.

(10) Patent No.: US 7,237,603 B2
(45) Date of Patent: Jul. 3, 2007

(54) HEAT EXCHANGER OF VENTILATING SYSTEM

(75) Inventors: Soo-Yeon Shin, Gimhae (KR); Seong-Hwan Lee, Changwon (KR); Min-Chul Cho, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/536,958

(22) PCT Filed: Dec. 2, 2002

(86) PCT No.: PCT/KR02/02264

§ 371 (c)(1),
(2), (4) Date: May 31, 2005

(87) PCT Pub. No.: WO2004/051171

PCT Pub. Date: Jun. 17, 2004

(65) Prior Publication Data

US 2006/0060338 A1    Mar. 23, 2006

(51) Int. Cl.
    *F28F 3/02*    (2006.01)
(52) U.S. Cl. .................................. 165/166; 165/164
(58) Field of Classification Search ............. 165/164, 165/166
    See application file for complete search history.

(56) References Cited

U.S. PATENT DOCUMENTS

| | | | | | |
|---|---|---|---|---|---|
| 1,833,166 | A | * | 11/1931 | Lucke | 165/166 |
| 2,511,084 | A | * | 6/1950 | Shaw | 165/166 |
| 2,571,631 | A | * | 10/1951 | Trumpler | 165/166 |
| 2,959,400 | A | * | 11/1960 | Simpelaar | 165/166 |
| 2,985,433 | A | * | 5/1961 | Simpelaar | 165/166 |
| 3,568,461 | A | * | 3/1971 | Hoffman | 202/158 |
| 3,845,814 | A | * | 11/1974 | Kun | 165/148 |
| 4,170,122 | A | * | 10/1979 | Cowell | 72/186 |
| 4,246,963 | A | * | 1/1981 | Anderson | 165/166 |
| 4,310,960 | A | * | 1/1982 | Parker | 29/890.039 |
| 4,352,273 | A | * | 10/1982 | Kinsell et al. | 165/166 |
| 4,460,388 | A | | 7/1984 | Fukami et al. | |
| 4,572,766 | A | * | 2/1986 | Dimitriou | 159/28.6 |
| 4,600,053 | A | * | 7/1986 | Patel et al. | 165/170 |
| 5,125,453 | A | * | 6/1992 | Bertrand et al. | 165/153 |
| 5,228,515 | A | * | 7/1993 | Tran | 165/166 |

(Continued)

FOREIGN PATENT DOCUMENTS

GB    1 556 315 A    11/1979

(Continued)

*Primary Examiner*—Teresa J. Walberg
(74) *Attorney, Agent, or Firm*—Birch, Stewart, Kolasch & Birch, LLP (57) ABSTRACT

A heat exchanger of a ventilating system includes a plurality of heat exchange plates which are laminated at a predetermined interval, a first heat exchange portion which is positioned among the heat exchange plates and through which outdoor air passes and a second heat exchange portion which is positioned among the heat exchange plates in turn with the first heat exchange portion and through which indoor air passes. The first and second heat exchange portions are composed of a plurality of heat exchange members having a predetermined length, and an inner surface of one heat exchange member and an outer surface of the other heat exchange member are aligned to face each other. Accordingly, the heat exchanger can improve heat transfer performance by restraining development of a boundary layer by improving air flowing structure of the heat exchanger.

5 Claims, 8 Drawing Sheets

U.S. PATENT DOCUMENTS

| | | |
|---|---|---|
| 5,655,600 A | 8/1997 | Dewar et al. |
| 5,915,469 A * | 6/1999 | Abramzon et al. .......... 165/166 |
| 5,931,219 A * | 8/1999 | Kull et al. .................... 165/51 |
| 6,244,334 B1 * | 6/2001 | Wu et al. .................... 165/166 |
| 6,470,963 B2 * | 10/2002 | Carpentier ................. 165/166 |

FOREIGN PATENT DOCUMENTS

| | | |
|---|---|---|
| JP | 59 167696 A | 9/1984 |
| JP | 8 145587 A | 6/1996 |
| JP | 11-337276 A | 12/1999 |
| JP | 2000-356493 A | 12/2000 |
| JP | 2000-356494 A | 12/2000 |
| WO | WO-03/091648 A1 | 11/2003 |

* cited by examiner

HEAT EXCHANGER OF VENTILATING SYSTEM

TECHNICAL FIELD

The present invention relates to a ventilating system for exchanging indoor air and outdoor air and particularly, to a heat exchanger of a ventilating system, capable of improving heat exchanging performance between outdoor air and indoor air.

BACKGROUND ART

Generally, a ventilating system is a system for discharging polluted indoor air to the outdoor and sucking fresh outdoor air to the indoor, and the system includes an air cleaner for removing dust and foreign materials contained in the outdoor air, and a heat exchanger for transferring heat of the discharged indoor air to the sucked outdoor air.

Figure 1:
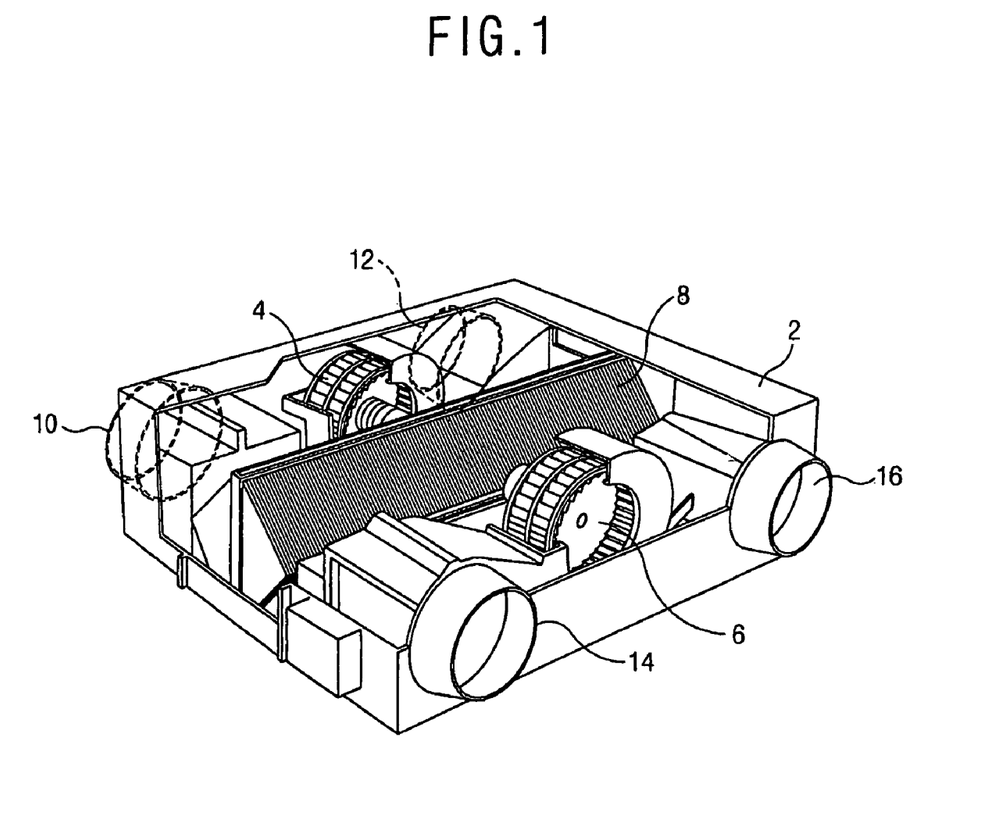
FIG. 1 is a partially cut perspective view showing the structure of a general ventilating system.

FIG. 1 is a perspective view showing a conventional ventilating system.

The ventilating system includes a case 2 which is mounted on a wall for dividing indoor and outdoor, blowing fans 4 and 6 which are mounted in the case 2, for ventilating air which is sucked and discharged, an air cleaner (not shown) which is installed in a portion to which the outdoor air inside the case 2 is sucked, for cleaning the outdoor air sucked to the indoor, and a heat exchanger 8 which is positioned inside the case 2, for performing a heat exchanging operation of indoor air discharged the outdoor and outdoor air sucked to the indoor.

Here, the case 2 is disposed in a hole formed on the wall for diving the indoor and outdoor, and accordingly, one side is positioned indoors and the other side is positioned outdoors. At this time, an outdoor suction hole 10 to which outdoor air is sucked and an indoor discharging hole 12 through which indoor air is discharged to the outdoor are respectively formed on the side wall of the case 2 positioned outdoors, and an indoor discharging hole 14 through which outdoor air is discharged to the indoor and indoor suction hole 16 to which indoor air is sucked are respectively formed on the side wall of the case 2 positioned indoors, The blowing fans 4 and 6 includes a discharging blowing fan 4 which is installed in a position connected with the outdoor discharging hole 12, for providing a blowing pressure for discharging the indoor air to the outdoor, and a suction blowing fan 6 which is installed in a position connected with the indoor discharging hole 14, for providing a blowing pressure for sucking the outdoor air to the indoor.

Figure 2:
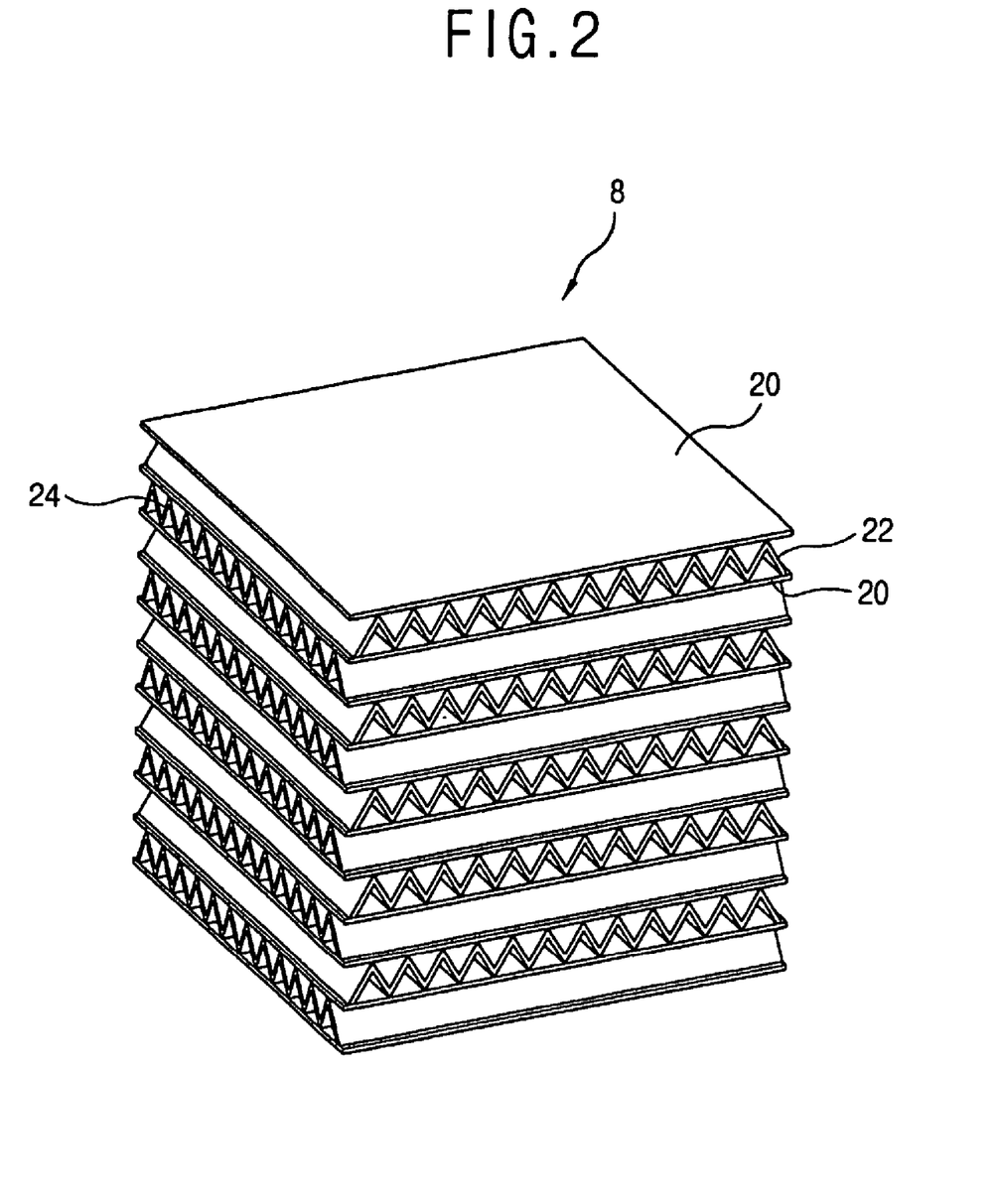
FIG. 2 is a partial perspective view showing a conventional heat exchanger of a ventilating system.
Figure 3:
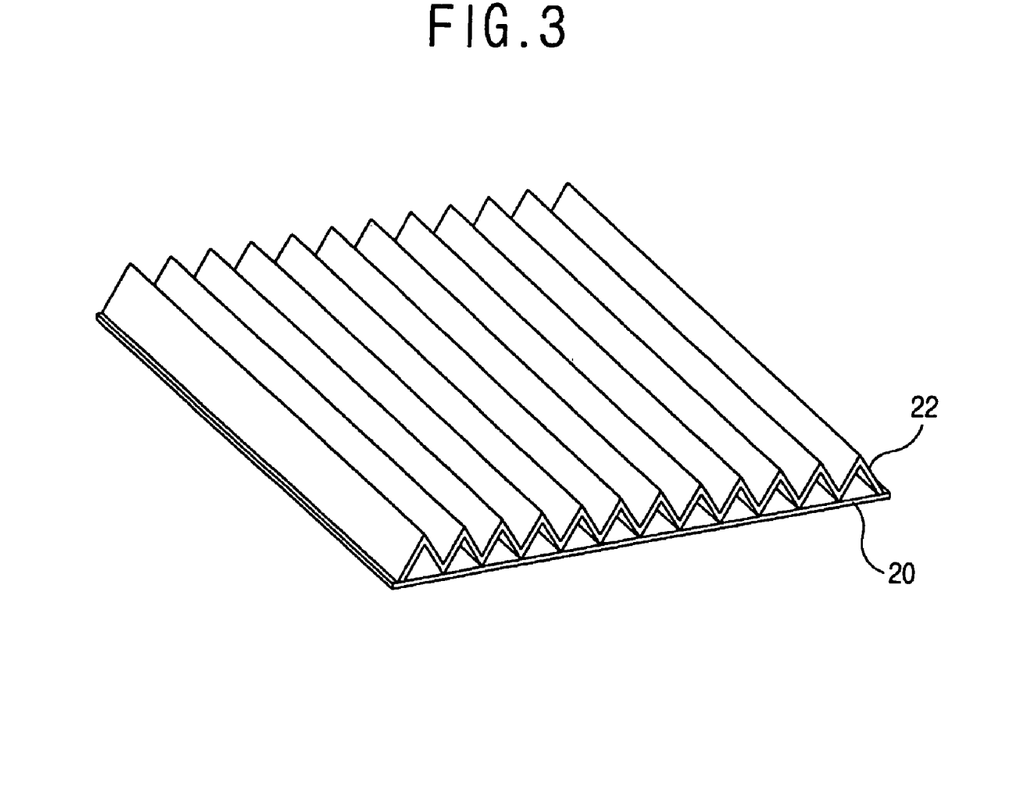
FIG. 3 is a perspective view showing a conventional corrugation plate of the heat exchanger of a ventilating system.

FIG. 2 is a perspective view showing a conventional heat exchanger of a ventilating system, and FIG. 3 is a partial perspective view showing the conventional heat exchanger of a ventilating system.

The conventional heat exchanger 8 includes a plurality of base plates 20 which are laminated at a regular interval in a shape of a thin plate, first corrugation plates 22 which are respectively laminated in the spaces among the base plates 20, through which indoor air passes, and second corrugation plates 24 which are respectively laminated in the base plates 20 to be mutually crossed with the first corrugation plates 22 in turn, through which outdoor air passes.

Here, the first and second corrugation plates 22 and 24 are curved in a triangular shape, and indoor and outdoor air passes to the inner and outer sides thereof, thus to mutually exchange heat.

Such heat exchanger 8 is formed in a rectangular shape by sequentially laminating the first corrugation plates 22, base plates 20, and second corrugation plates 24. The upper and lower surfaces of the heat exchanger 8 are respectively closed by the base plate 20, and the both side surfaces of the heat exchanger are connected with the outdoor suction hole 10 and indoor discharging hole 14, and outdoor air passes therethrough. Another both side surfaces of the heat exchanger are respectively connected with the outdoor discharging hole 12 and indoor suction hole 16, and indoor air passes therethrough.

That is, as the outdoor air which passes the first corrugation plates 22 and indoor air which passes the second corrugation plates 24 pass while being crossed with each other, heat exchange is performed by transferring heat of the indoor air through the base plates 20.

The operation of the conventional heat exchanger for the ventilating system with the above structure will be described as follows.

When the sucking blowing fan 6 is driven, the outdoor air is sucked to the outdoor suction port 10 and is supplied to the indoor through the indoor discharging hole 14 by passing the first corrugation plate 22. When the discharging blowing fan 4 is driven, the indoor air is sucked through the indoor suction hole 16 and discharged to the indoor through the outdoor discharging hole 12 by passing the second corrugation plate 24.

Here, as the outdoor air passing in the first corrugation plate 22 and indoor air passing the second corrugation plate 24 flow while being crossed with each other, heat in the indoor air is transferred to the outdoor air through the base plate 20, and the outdoor air which sucked the heat of the indoor air is supplied to the indoor.

As described above, since heat in the discharged indoor air is sucked to the outdoor air and discharged to the indoor, rapid temperature change of the indoor air can be prevented in case of operating ventilation.

However, in the conventional heat exchanger of the ventilating system, the first and second corrugation plates 22 and 24 are formed in a shape of a plate having a corrugation of a predetermine a corrugation of a predetermineis developed as the air flowing in the first and second corrugation plates moves along from the inlet side to the outlet side. Therefore, heat transfer efficiency is degraded and indoor temperature is rapidly changed in case of ventilating since the outdoor air sucked to the indoor could not absorb heat in the indoor air. Also, energy consumption for recovering the indoor air is increased and indoor air conditioning performance is degraded.

Figure 4:
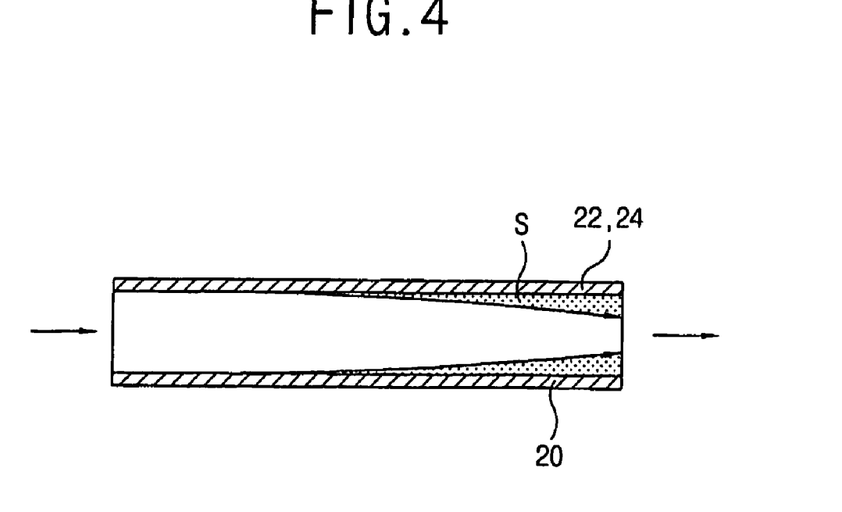
FIG. 4 is a cross-sectional view showing a movement of the air in the pipe to which the conventional heat exchanger of a ventilating system is applied.

That is, as shown in FIG. 4, particles of viscous air which flow inside a pipe of the first and second corrugation plates 22 and 24 stick on the surface contacted on a surface of the inside of the pipe when the viscous air flows on the surface of the inside of the pipe. As the air gets apart from the surface of the inside of the pipe, the air recovers the speed and gains a speed of a free flow in a position at a predetermined distance from the surface of the solid material. At this time, as the air is get apart from the surface of the inside of the pipe, a boundary layer S is formed.

As described above, as the air flowing on the surface of the inside of the pipe is processed, the boundary layer is developed and the air gets apart from the surface of the inside of the pipe, thus to degrade heat transfer efficiency that the heat of the indoor air is transferred to the outdoor air through the base plate 20.

DISCLOSURE OF THE INVENTION

Therefore, an object of the present invention is to provide a heat exchanger of a ventilating system, capable of improving heat transfer performance by restraining development of the boundary layer by improving air flowing structure of a heat exchanger.

To achieve these and other advantages and in accordance with the purpose of the present invention, as embodied and broadly described herein, there is provided a heat exchanger of a ventilating system, including a plurality of heat exchange plates which are laminated at a predetermined interval, a first heat exchange portion which is positioned among the heat exchange plates and through which outdoor air passes and a second heat exchange portion which is positioned among the heat exchange plates in turn with the first heat exchange portion and through which indoor air passes. The first and second heat exchange portions are composed of a plurality of heat exchange members having a predetermined length, and an inner surface of one heat exchange member and an outer surface of the other heat exchange member are aligned to face each other.

The heat exchanging members are formed in a plate type in which waves having a predetermined height are formed at a regular interval.

The length of the heat exchanging members is 3 mm~5 mm so that generation of a boundary layer can be restrained.

The heat exchanger of the ventilating system includes a plurality of heat exchange plates which are laminated at a predetermined interval, a first heat exchange portion which is positioned among the heat exchange plates and through which outdoor air passes and a second heat exchange portion which is positioned among the heat exchange plates in turn with the first heat exchange portion and through which indoor air passes. The first and second heat exchange portions are composed of a plurality of heat exchange members having a predetermined length, and the heat exchange members are aligned at a predetermined interval.

The heat exchange members are formed in a plate type in which waves having a predetermined height are formed at a regular interval.

A height d2 of a path through which air of the heat exchange members passes and an interval d1 among the heat exchange members are formed to satisfy a formula of $10 \leq D1/D2 \leq 15$.

First partitions for closing the second heat exchange portion are respectively attached rtion are respectively attached heat exchanger through which the outdoor air passes, and second partitions for closing the first heat exchange portion are respectively attached on the other both side surfaces of the heat exchanger through which the indoor air passes.

The heat exchanger of the ventilating system includes a plurality of heat exchange plates which are laminated at a predetermined interval, a first air path in which a plurality of embossing protrusions are formed among the heat exchange plates so that outdoor air passes and a second air path which is positioned in turn with the first air path, and in which a plurality of embossing protrusions are formed among the heat exchange plates.

First partitions for closing the second air path are respectively attached on the both side surfaces of the heat exchanger which is opened by the first air path, and second partitions for closing the first air path are respectively attached on the other both side surfaces of the heat exchanger which is opened by the second air path.

The embossing protrusions are formed in a convex shape having a predetermined height.

The process of aligning the embossing protrusions of the first row at a predetermined interval, and respectively aligning the embossing protrusions of the second row among the embossing protrusions of the first row is repeated.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Reference will now be made in detail to the preferred embodiments of the present invention, examples of which are illustrated in the, accompanying drawings.

As the embodiment of the heat exchanger of the ventilating system in accordance with the present invention, there can be a plurality of them, and hereinafter, the most preferable one will be described.

Figure 5:
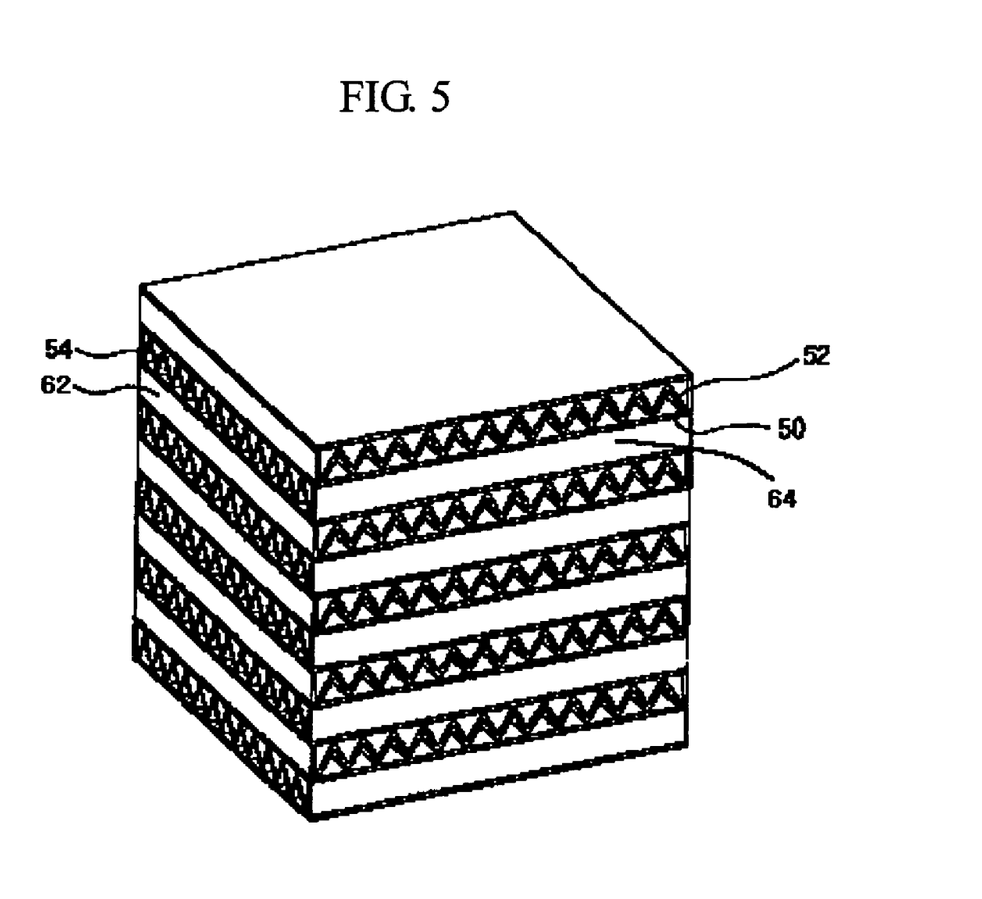
FIG. 5 is a partial perspective view showing a heat exchanger of a ventilating system in accordance with an embodiment of the present invention.

FIG. 5 is a perspective view showing a heat exchanger of a ventilating system in accordance with the present invention.

With reference to FIG. 1, in the ventilating system in accordance with the present invention, a case 2 is mounted to penetrate a wall which divides the indoor and outdoor, a side surface of the case 2 is positioned outdoors and the other side surface is positioned indoors. Here, an outdoor suction hole 10 through which the outdoor air is sucked and an outdoor discharging hole 12 through which the indoor air is discharged are respectively formed on a side surface positioned at the outdoor of the case 2, and an indoor suction hole 16 through which the indoor air is sucked and an indoor discharging hole 14 through which the outdoor air is discharged to the indoor are respectively formed on a side surface positioned at the indoor of the case 2.

A discharging blowing fan 4 for giving a blowing pressure for discharging the indoor air to the outdoor is installed in a position connected with the outdoor discharging hole 12 inside the case 2, and a suction blowing fan 6 for giving a blowing pressure for sucking the outdoor air to the indoor is installed in a position connected with the indoor discharging hole 14 inside the case 2.

An air cleaner (not shown) for removing foreign materials, dust and the like contained in the outdoor air is installed on the suction channel inside the case 2, and a heat exchanger 8 for transferring heat of the discharged indoor air to the sucked indoor air is installed inside the case 2.

As shown in FIG. 5, the heat exchanger 8 includes heat exchange plates 50 which are laminated in a thin plate shape at a predetermined interval as plural, a first heat exchange portion 52 which is laminated among the heat exchange plates 50 to have a space through which outdoor air passes and is aligned being divided as plural to prevent development of a boundary layer, and a second heat exchange portion 54 which is laminated among the heat exchange plates 50 to be crossed with the first heat exchange portion 52 to have a space through which indoor air passes and is aligned being divided as plural to prevent development of a boundary layer in case the indoor air flows.

First partitions 62 for preventing inflow of indoor air to the first heat exchange portion 52 are attached on the both side surfaces of the heat exchanger through which the outdoor air passes, and second partitions 64 for preventing inflow of the outdoor air to the second heat exchange portion 54 are attached on other both side surfaces of the heat exchanger through which the indoor air passes.

The first and second heat exchange portions 52 and 54 are laminated while being crossed with each other so that the outdoor air and indoor air flow while being crossed with each other, but the portions have an identical shape.

Figure 6:
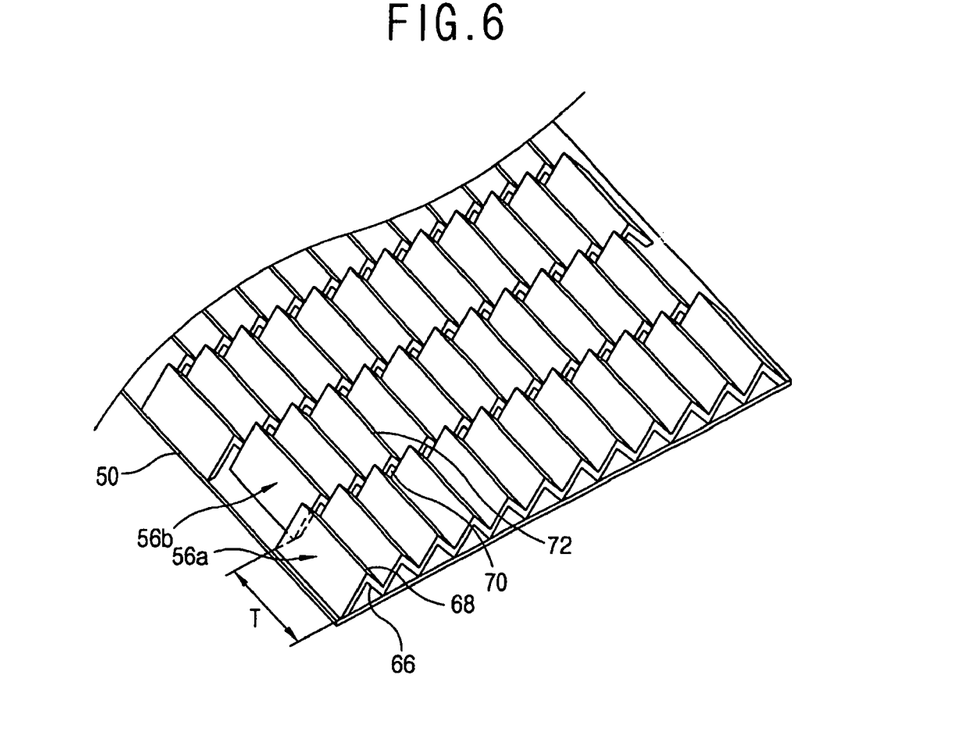
FIG. 6 is a partial perspective view showing the heat exchange member of the heat exchanger of a ventilating system in accordance with the embodiment of the present invention.

As shown in FIG. 6, such first and second heat exchange portions 52 and 54 are composed of a plurality of heat exchange members 56 in which spaces through which air can pass are formed by giving wave to the thin plate. The plurality of heat exchange members 56A and 56B are repeatedly aligned on the surface of the heat exchange plate 50 under the condition that the members are contacted with each other, and air passes on the inner and outer surfaces the members.

Here, the heat exchange members 56A and 56B are aligned so that the air which passed through the inner surface 66 of one heat exchange member 56A passes the outer surface 72 of the heat exchange member 56B which is sequentially aligned. That is, the inner surface 66 of one heat exchange member 56A and outer surface 72 of the other heat exchange member 56B face each other.

In such heat exchange members 56A and 56B, the operation that air which passed the inner surface of one heat exchange member 56A flows along the outer surface 72 of the other heat exchange member 56B is repeated. The air flowing on the outer surface 68 of one heat exchanger 56A passes the heat exchanger by repeating the operation of flowing along the inner surface 70 of the other heat exchange member 56B.

Here, it is desirable that the length T of the heat exchange members 56A and 56B is manufactured as 3 mm~6 mm with which a boundary layer is not formed when the air flows.

It is desirable that the heat exchange members 56A and 56B of the first and second heat exchange portions 52 and 54 are manufactured with materials having an excellent heat transfer performance.

The operation of the heat exchanger of the ventilating system in accordance with the embodiment of the present invention will be described as follows.

When the suction ventilation fan 6 is driven, the outdoor air is sucked through the outdoor suction hole 10, removes various dusts and foreign materials passing through the air cleaner, and is supplied to the indoor through the indoor discharging hole 14 by passing the first heat exchange portion 52. When the discharging blowing fan 4 is driven, the indoor air is sucked through the indoor suction hole 16, and is discharged to the outdoor through the outdoor discharging hole 12 by passing the second heat exchange portion 54.

Here, the indoor air which passes through the first heat exchange portion 52 and outdoor air which passes through the second heat exchange portion 54 flow while being crossed with each other, heat contained in the indoor air is sucked to the outdoor air through the heat exchange plate 50, and the completely heat exchanged outdoor air is supplied to the indoor.

Figure 7:
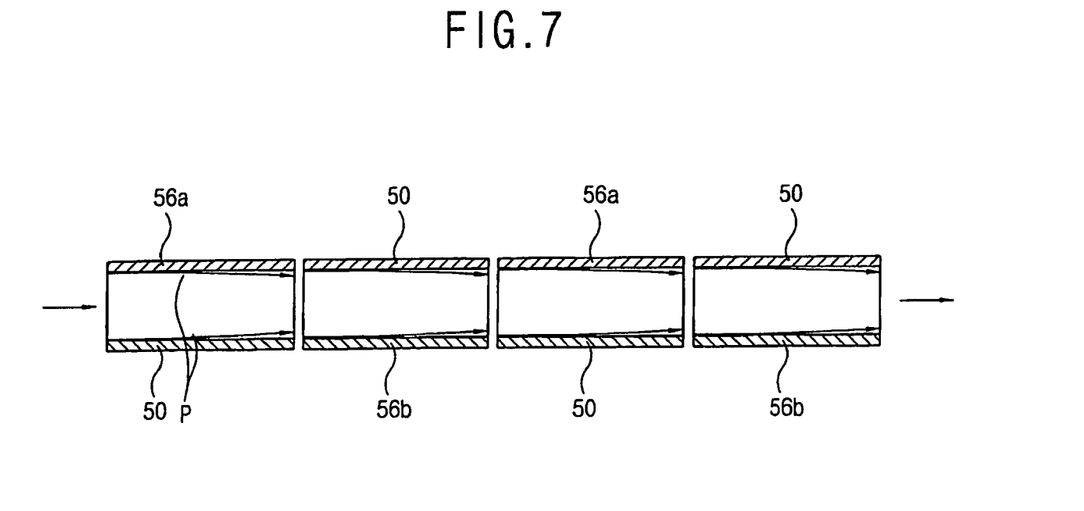
FIG. 7 is a cross-sectional view showing a movement of the air in the pipe to which the heat exchanger of the ventilating system in accordance with the embodiment of the present invention.

As shown in FIG. 7, in the operation of the heat exchanger, the air which passes the inner surface 66 of one heat exchange member 56A passes the outer surface of the other heat exchange member 56B right before a boundary layer which is parted from the surface of the heat exchange member 56A is formed, and accordingly, the air flows under the condition that the air is in contact with the surface of the other heat exchange member 56B as the condition becomes identical as in case the air initially passes the inside of the pipe as shown in an arrow P. The air which passes the outer surface 68 of one heat exchange member 56A passes the inner surface 70 of a heat exchange member 56B right before a boundary layer is formed in the air, and accordingly, the air can continuously flow under the condition that the air is in contact with the surface of the heat exchange members 56A and 56B when the air passes the first and second heat exchange portions 52 and 54, thus to restrain development of the boundary layer and improve performance of heat transfer performance.

Figure 8:
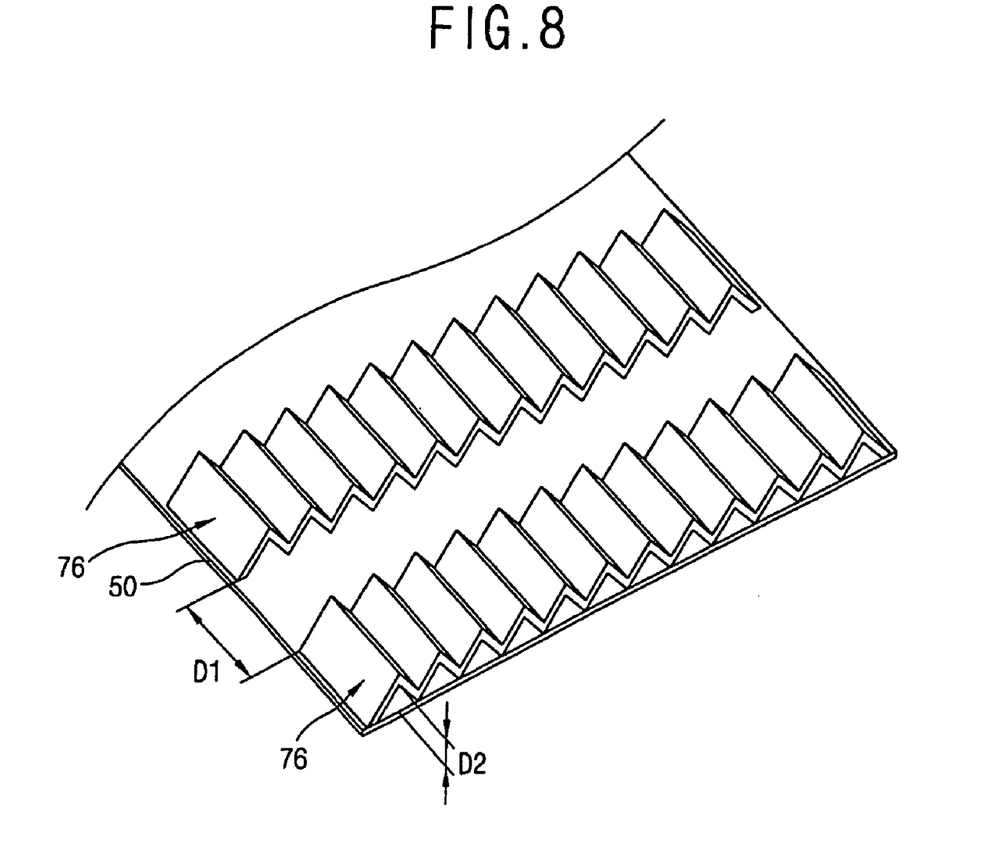
FIG. 8 is a partial perspective view showing a heat exchange member of the heat exchanger of a ventilating system in accordance with a second embodiment of the present invention.

FIG. 8 is a partial perspective view showing the heat exchange member of the heat exchanger of the ventilating system in accordance with a second embodiment of the present invention.

The heat exchanger in accordance with the second embodiment is composed of said heat exchange plate 50, and first and second heat exchange portions 72 and 74 as in the first embodiment, but the structure that the heat exchange member is aligned in the heat exchange plate 50 is differentiated to restrain development of the boundary layer.

In the alignment structure of the heat exchange member 76 which is aligned on the heat exchange plate 50 of the heat exchanger, a plurality of heat exchange members 76 are aligned at a predetermined interval as plural.

In the heat exchange members 76, waves having a predetermined height D2 are repeatedly formed so that air can pass on a thin plate having a predetermined length, and the heat exchange members 76 are formed at a predetermined interval D1.

Here, the height d2 of the triangular path of the heat exchange members 76 and the interval d1 among the heat exchange members 76 satisfy the formula of $10 \leq D1/D2 \leq 15$ to restrain development of the boundary layer.

In the heat exchanger in accordance with the second embodiment of the present invention with the above structure, air respectively flows to the inner surface and outer surface of the heat exchange member 76, is mixed in a space among the heat exchange members, and flows to the inner and outer surfaces of the other heat exchange member 76. Since the process is repeated, development of the boundary layer is restrained, thus to improve heat exchange performance between the outdoor and indoor air.

Figure 9:
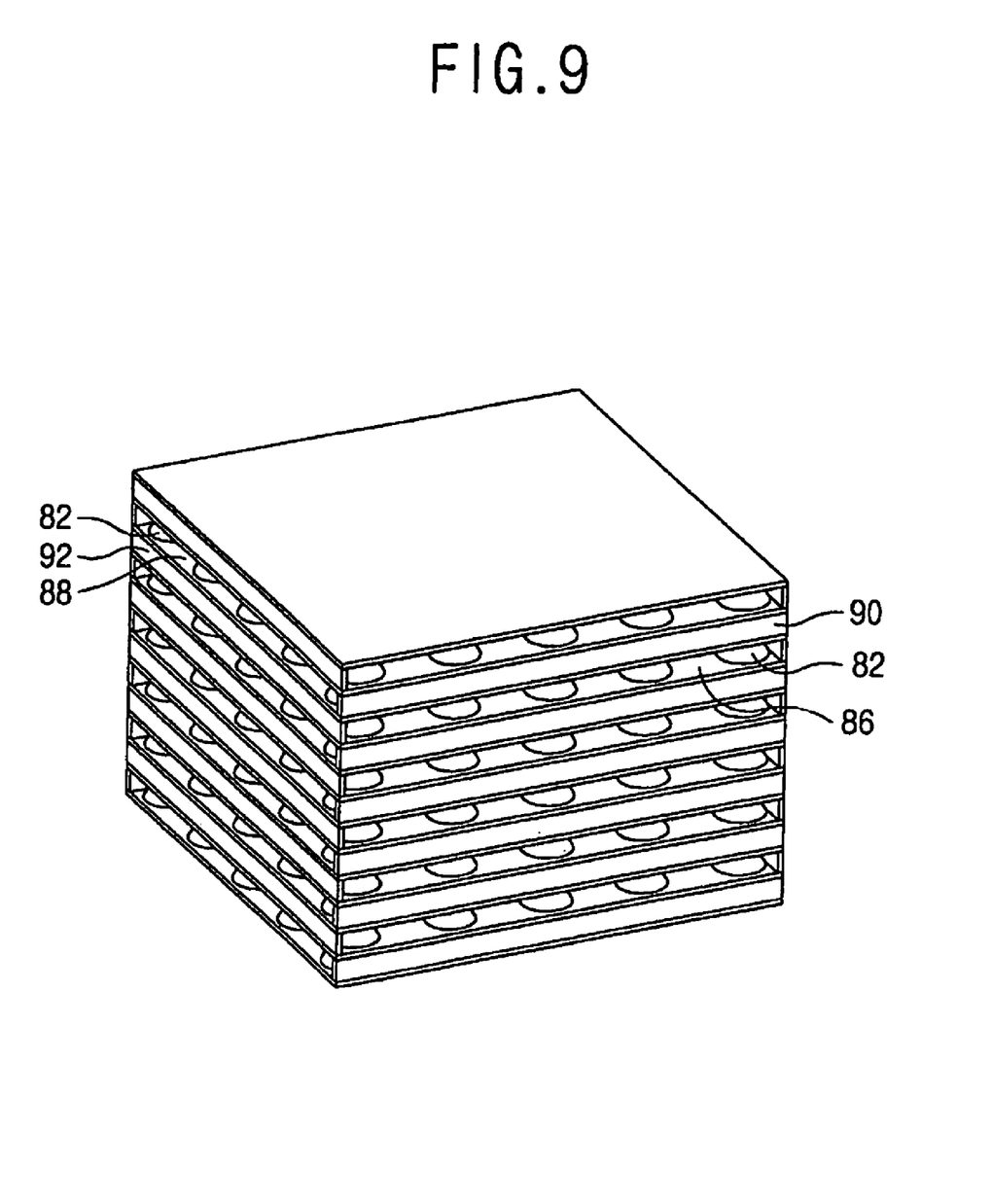
FIG. 9 is a partial perspective view showing a heat exchanger of a ventilating system in accordance with a third embodiment of present invention.

FIG. 9 is a partial perspective view showing the heat exchanger of the ventilating system in accordance with a third embodiment of present invention.

In the heat exchanger in accordance with the third embodiment, a first air path 86 through which the outdoor air passes is formed by forming a plurality of embossing protrusions 82 having a predetermined height among the heat exchange plates 80, and a second air path 88 through which the indoor air passes is formed by forming a plurality of embossing protrusions 82 having a predetermined height in turn with the first air path 86 among the heat exchange plates 80.

First partitions 90 for closing the second air path 88 are attached on the both side surfaces of the heat exchanger which is opened by the first air path 86, and second partitions 92 for closing the first air path 86 are attached on the other both side surfaces of the heat exchanger which is opened by the second air path 88.

Figure 10:
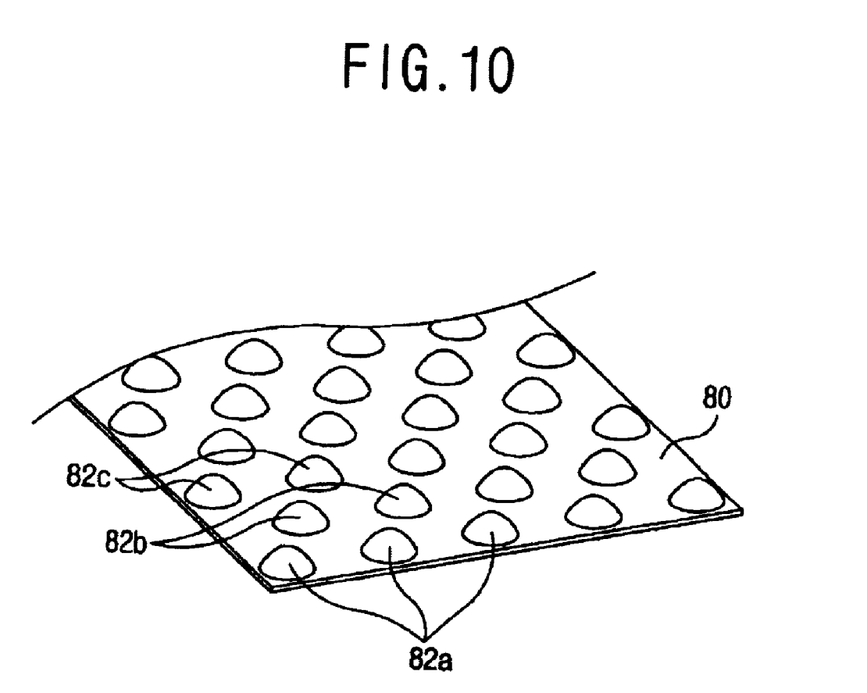
FIG. 10 is a perspective view showing an aligning structure of an embossing protrusion of the heat exchanger of the ventilating system in accordance with the third embodiment of the present invention.

Here, as shown in FIG. 10, in the embossing protrusions 82, embossing protrusions of the first row 82A are aligned on the upper surface of the heat exchange plate 80 at a predetermined interval, embossing protrusions of the second row 82B are respectively aligned among the embossing protrusions of the first row 82A, embossing protrusions of the third row 82C are respectively aligned among the embossing protrusions of the second row 82B. The above process is repeated.

In the heat exchanger in accordance with the third embodiment, air is collided with the embossing protrusions 82, and irregularly dispersed, and accordingly, development of the boundary layer is restrained. Therefore, the air collided with the embossing protrusions 82 flows under the condition that it is in contact with the surface of the heat exchange plate 80, thus to improve heat transfer performance.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

INDUSTRIAL APPLICABILITY

In the heat exchanger of the ventilating system with the above structure and operation, the first and second heat exchange portions in which the outdoor and indoor air respectively pass while being crossed with each other are attached being divided into a plurality of parts on the surface of the heat exchange plate. Accordingly, the divided heat exchange plates are positioned being crossed or positioned at a predetermined interval, and development of the boundary layer in the air which passes therethrough, thus to improve heat transfer performance.

Therefore, since changes in the indoor temperature are small, energy consumption can be minimized and the indoor temperature can be uniformly maintained, thus to form more comfortable indoor environment.

The invention claimed is:

1. A heat exchanger of a ventilating system, comprising:
   a plurality of heat exchange plates which are laminated at a predetermined interval, a first air path and a second air path being respectively located between two adjacent heat exchange plates;
   a first heat exchange portion located in the first air path through which outdoor air passes; and
   a second heat exchange portion located in the second air path through which indoor air passes,
   wherein each of the first and second heat exchange portions includes a plurality of corrugation plates, two adjacent corrugation plates in the corresponding air path being aligned in an air flow direction in the corresponding air path and being spaced apart from each other with an interval along the air flow direction in the corresponding air path, the interval being larger than a height of the corresponding air path.

2. The exchanger of claim 1, wherein each of the corrugation plates is an integral corrugation plate.

3. The exchanger of claim 1, wherein the interval between the two adjacent corrugation plates in the corresponding air path is D1 and the height of the corresponding air path is D2, and wherein $10 \leq D1/D2 \leq 15$.

4. The exchanger of claim 1, wherein the heat exchange plates are substantially flat.

5. The exchanger of claim 1, wherein the interval between the two adjacent corrugated plates is substantially free of corrugation.

* * * * *